(12) United States Patent  (10) Patent No.: US 7,984,373 B2
Machiraju et al.  (45) Date of Patent: Jul. 19, 2011

(54) EDI INSTANCE BASED TRANSACTION SET DEFINITION

(75) Inventors: Surendra Machiraju, Redmond, WA (US); Suraj Gaurav, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 11/362,425

(22) Filed: Feb. 24, 2006

(65) Prior Publication Data

US 2007/0203928 A1  Aug. 30, 2007

(51) Int. Cl.
*G06F 17/27* (2006.01)
(52) U.S. Cl. ........................................ 715/239
(58) Field of Classification Search ................ 715/239
See application file for complete search history.

(56) References Cited

U.S. PATENT DOCUMENTS

| | | | |
|---|---|---|---|
| 4,729,096 | A | 3/1988 | Larson |
| 4,787,035 | A | 11/1988 | Bourne |
| 4,860,203 | A | 8/1989 | Corrigan et al. |
| 4,951,196 | A | 8/1990 | Jackson |
| 5,202,977 | A | 4/1993 | Pasetes, Jr. et al. |
| 5,878,419 | A | 3/1999 | Carter |
| 5,897,645 | A | 4/1999 | Watters |
| 5,915,259 | A | 6/1999 | Murata |
| 6,101,556 | A | 8/2000 | Piskiel et al. |
| 6,256,667 | B1 | 7/2001 | W.ang.hlander et al. |
| 6,302,326 | B1 | 10/2001 | Symonds et al. |
| 6,377,953 | B1 | 4/2002 | Gawlick et al. |
| 6,418,400 | B1 | 7/2002 | Webber |
| 6,442,569 | B1 | 8/2002 | Crapo et al. |
| 6,591,260 | B1 | 7/2003 | Schwarzhoff et al. |
| 6,609,200 | B2 | 8/2003 | Anderson et al. |
| 6,687,873 | B1 | 2/2004 | Ballantyne et al. |
| 6,735,598 | B1 | 5/2004 | Srivastava |

(Continued)

FOREIGN PATENT DOCUMENTS

JP  1196161  4/1999

(Continued)

OTHER PUBLICATIONS

Unknown, "CAM: Content Assembly Mechanism—business transaction information management", http://www.oasis-open.org/committees/downlad.php/5929/CAM%20Technical%20brochure%2003Mar04.pdf, printed on Feb. 23, 2006, 7 pages, Oasis, USA.

(Continued)

*Primary Examiner* — Laurie Ries
*Assistant Examiner* — Tionna Smith
(74) *Attorney, Agent, or Firm* — Senniger Powers LLP

(57) ABSTRACT

Creating an electronic data interchange (EDI) transaction from a description of the EDI schema. The description defines the EDI schema in a non-EDI structure. The description of the EDI schema is received. A plurality of data units included in the received description of the EDI schema is identified. The plurality of data units describes the content of the EDI schema. The identified plurality of data units is analyzed to determine the content of the EDI schema. The document definition is generated for the EDI schema as a function of the analyzed plurality of data units. The document definition is used to create an EDI transaction according to the EDI schema.

16 Claims, 7 Drawing Sheets

U.S. PATENT DOCUMENTS

| | | | |
|---|---|---|---|
| 6,772,180 | B1 | 8/2004 | Li et al. |
| 6,785,689 | B1 | 8/2004 | Daniel et al. |
| 7,051,072 | B2 | 5/2006 | Stewart et al. |
| 7,249,157 | B2 | 7/2007 | Stewart et al. |
| 7,281,211 | B2 * | 10/2007 | Jeannette et al. ............ 715/234 |
| 7,599,944 | B2 * | 10/2009 | Gaurav et al. ......................... 1/1 |
| 2001/0018697 | A1 | 8/2001 | Kunitake et al. |
| 2001/0049743 | A1 | 12/2001 | Phippen et al. |
| 2001/0056504 | A1 | 12/2001 | Kuznetsov |
| 2002/0042757 | A1 | 4/2002 | Albazz et al. |
| 2002/0049790 | A1 | 4/2002 | Ricker et al. |
| 2002/0083099 | A1 | 6/2002 | Knauss et al. |
| 2002/0103715 | A1 | 8/2002 | Bennett et al. |
| 2002/0111964 | A1 | 8/2002 | Chen et al. |
| 2002/0152175 | A1 | 10/2002 | Armstrong et al. |
| 2002/0178103 | A1 | 11/2002 | Dan et al. |
| 2003/0018666 | A1 | 1/2003 | Chen et al. |
| 2003/0101184 | A1 | 5/2003 | Chiu et al. |
| 2003/0121001 | A1 | 6/2003 | Jeannette et al. |
| 2003/0130845 | A1 | 7/2003 | Poplawski |
| 2003/0140048 | A1 | 7/2003 | Meier et al. |
| 2003/0149934 | A1 | 8/2003 | Worden |
| 2003/0154404 | A1 | 8/2003 | Beadles et al. |
| 2003/0158854 | A1 | 8/2003 | Yoshida et al. |
| 2003/0167446 | A1 | 9/2003 | Thomas |
| 2003/0182452 | A1 | 9/2003 | Upton |
| 2003/0233420 | A1 | 12/2003 | Stark et al. |
| 2004/0010753 | A1 | 1/2004 | Salter et al. |
| 2004/0107213 | A1 | 6/2004 | Zubeldia et al. |
| 2004/0153968 | A1 | 8/2004 | Ching et al. |
| 2004/0177094 | A1 | 9/2004 | Jacobs et al. |
| 2004/0193435 | A1 | 9/2004 | Fang |
| 2004/0205592 | A1 | 10/2004 | Huang |
| 2005/0004885 | A1 | 1/2005 | Pandian et al. |
| 2005/0038816 | A1 | 2/2005 | Easton |
| 2005/0055631 | A1 | 3/2005 | Scardina et al. |
| 2005/0060317 | A1 | 3/2005 | Lott et al. |
| 2005/0063387 | A1 | 3/2005 | Chen |
| 2005/0071344 | A1 | 3/2005 | Chen et al. |
| 2005/0114405 | A1 | 5/2005 | Lo |
| 2005/0131933 | A1 | 6/2005 | Jha |
| 2005/0132276 | A1 | 6/2005 | Panditharadhya et al. |
| 2005/0138648 | A1 | 6/2005 | Ahmed et al. |
| 2005/0150944 | A1 | 7/2005 | Melick et al. |
| 2005/0187973 | A1 | 8/2005 | Brychell, III et al. |
| 2005/0246415 | A1 | 11/2005 | Belfiore et al. |
| 2005/0256892 | A1 | 11/2005 | Harken |
| 2005/0256965 | A1 | 11/2005 | Hohmann et al. |
| 2005/0262130 | A1 | 11/2005 | Mohan |
| 2005/0278345 | A1 | 12/2005 | Andra et al. |
| 2006/0005254 | A1 | 1/2006 | Ross |
| 2006/0036522 | A1 | 2/2006 | Perham |
| 2007/0005786 | A1 | 1/2007 | Kumar et al. |
| 2007/0022375 | A1 | 1/2007 | Walker |
| 2007/0112579 | A1 | 5/2007 | Ratnakaran et al. |
| 2007/0145138 | A1 | 6/2007 | Snyder et al. |
| 2007/0220051 | A1 | 9/2007 | Brentano et al. |

FOREIGN PATENT DOCUMENTS

| | | |
|---|---|---|
| KR | 1020020054248 A | 6/2002 |
| KR | 20020054248 | 7/2002 |
| WO | 0133369 A1 | 5/2001 |
| WO | 0155895 A2 | 8/2001 |
| WO | 03021901 A2 | 3/2003 |
| WO | 03081457 A1 | 10/2003 |

OTHER PUBLICATIONS

Unknown, "EDI Tools", Stylus Studio, http://www.stylusstudio.com/edi/, printed on Jan. 2, 2006, 3 pages, Progress Software Corporation, USA.

Unknown, "OBOE—Open Business Objects for EDI an EDI and XML Software Developer's Toolkit", http://www.americancoders.com/OpenBusinessObiects/overview.html, updated on Oct. 31, 2005, 5 pages, Version 3.3.4, American Coders, Ltd., USA.

Unknown, "XML GUI Mapper with EDI Authoring Tools", http://www.redix.com/dtd13.htm, printed on Jan. 2, 2006, 4 pages, Redix International, Inc., USA.

Adams et al., "BizTalk Unleashed", Feb. 8, 2002, Sams, 54 selected pages.

"HIPAA Transaction Sets and Code Sets (HTSCS) 270 / 271 Companion Guide Specifications", Mar. 30, 2004, South Carolina Department of Health and Human Services, Version 1.1, [internet] http://www.scdhhshipaa.org, 38 pages.

Van De Putte, Geert, et al, "Implementing EDI Solution," Oct. 2003, IBM Redbook, 244 pages.

Unknown, "4.0 Emerging Industry Frameworks/Repositories," http://www.dcnicn.com/XMLEDICentral/CDRL/HTML/Draft task3delArpt/Draftask3delArpt-05.htm, printed on Jan. 2, 2006, 48 pages, USA.

Unknown, "Content Management Technology/Industry News, The Gilbane Report," http://gilbane.com/content management news.pl/2000/11/content management/news.html, Nov. 29, 2000, 30 pages Bluebill Advisors, Inc.

Kuramitsu Kimio et al, "Distributed Object-Oriented Schema to Share XML-based Catalogs among Business," Proceedings of the first International Conference on Web Information Systems Engineering, pp. 81-90, Jun. 2000, also available at http://xml.coverpages.org/kiki-wise2000.html, 16 pages, IEEE Press, USA.

Liu, Youzhong et al, "A Rule Warehouse System for Knowledge Sharing and Business Collaboration," UF CISE TR01-006A, http://www.cise.ufl.edu/tech reports/tr01/tr01-006.pdf, 2001, 67 pages, Database Systems R&D Center, University of Florida, FL.

Hinkelman, Scott, "Business Integration—Information Conformance Statements (BI-ICS)—An XML specification for declaring business information conformance," http://www.128.ibm.com/developerworks/xml/library/x-biics/, updated on Oct. 12, 2005, 4 pages, IBM, USA.

Unknown, "iWay Software 5.5: New Enhancements," http://www.iwaysoftware.com/products/iWay55 features.html, printed on Dec. 27, 2005, 3 pages, iWay Software, USA.

IBM: "WebSphere Data Interchange for Multiplatforms User's Guide", Dec. 3, 2004, XP002633582; Retrieved from the Internet: URL:ftp://public.dhe.ibm.com/software/integration/wdi/library/doc/wdi_32/pdf/wdiyac00.pdf; retrieved on Apr. 18, 2011.

webMethods: "webMethods EDI Module User's Guide Version 6.5", XP002633583; Apr. 29, 2005; Retrieved from the Internet: URL:http://documentation.softwareag.com/webmethods/adapters_estandards/eStandards/EDI/ED1_6-5/webMethods%20EDI%20Module%20User%027s%20Guide%206.5.pdf, retrieved on Apr. 18, 2011.

Supplementary European Search Report for Application No. 07 716 851.6, dated Apr. 5, 2011, 7 pgs.

\* cited by examiner

FIG. 3

| | |
|---|---|
| ST | *850*001 |
| BEG | *00*NE* 3859199838 19950727*IBM |
| PER | *AA*ANDREW CARLSON*TE*(708) 555-2930 |
| DTM | *002*19970523 |
| PO1 | 1*1*93*BX*145.39**CB*KOW-20392-10 |
| PID | *F****UNINTERRUPTIBLE POWER SYSTEM |
| PER | *AA*CAMILLA ANDERSON*TE*(708) 555-2011 |
| PO1 | *2*25*EA*35.68**CB1093-4927-001 |
| PID | *F****HIGH VOLUME PRINTER STAND |
| PER | *AA*MIRANDA CAPPELAN*TE*(708) 555-1111 |
| PO1 | *3*4*PC*2002.91**CB*ABX-2001 |
| PID | *F****ELECTRONICS CABINET PACKAGE (56" HIGH) |
| CTT | *3 |
| SE | *14*001 |

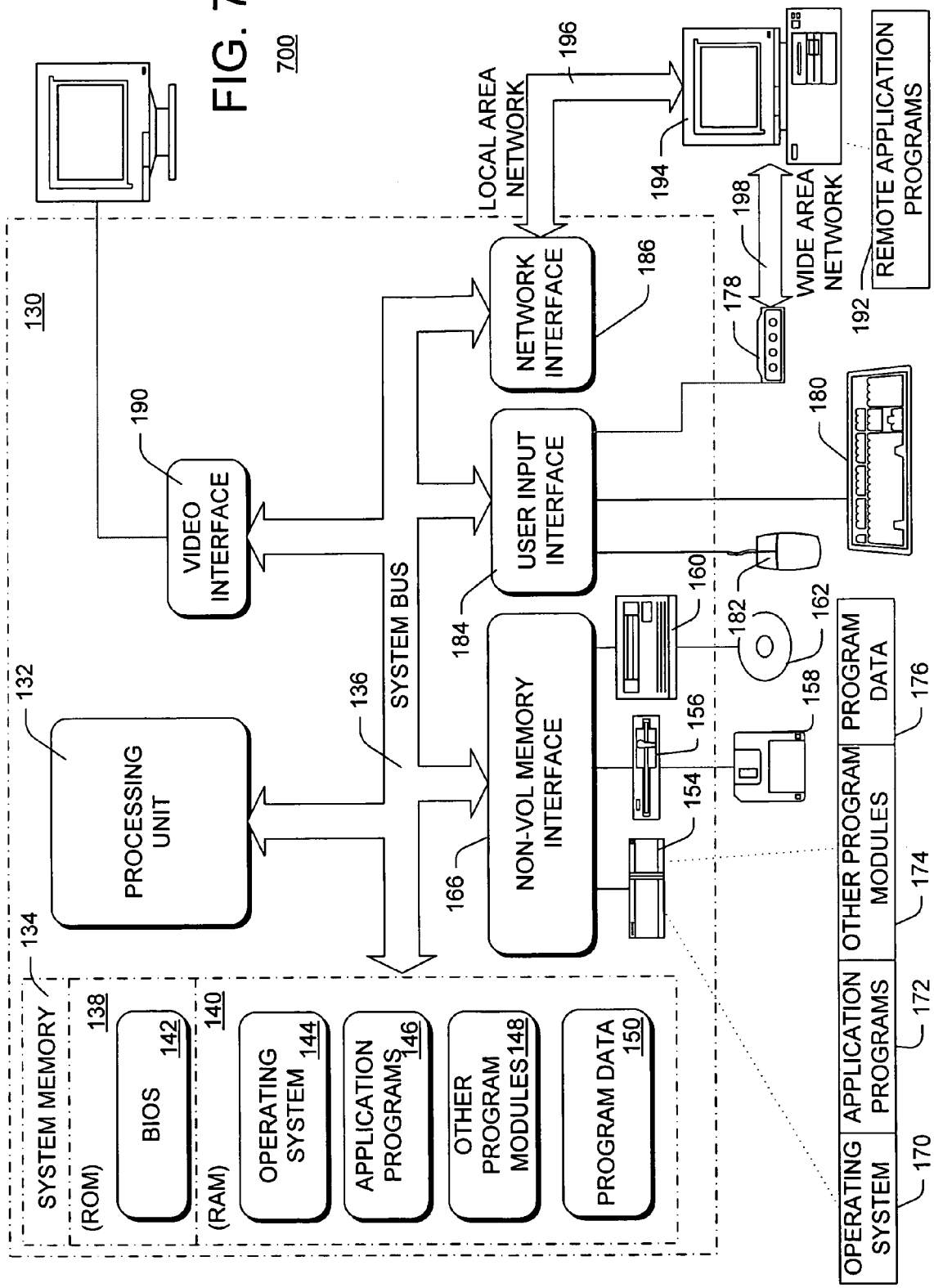

EDI INSTANCE BASED TRANSACTION SET DEFINITION

BACKGROUND

Electronic data interchange (EDI) is one of the ways businesses use for exchanging computer-to-computer business information based on approved formatting standards and schemas. For example, millions of companies around the world transmit data associated with business transactions (e.g., purchase orders, shipping/air bills, invoices, or the like) using EDI to conduct commerce.

In a typical EDI transaction model, a large business entity or an EDI integration broker trades with numerous partners and has the technical capability to handle numerous EDI transaction data in various EDI formats and schemas. These entities, also known as "hubs," transact with one or more suppliers, also known as "spokes". Each of the spokes typically is a relatively small business entity that is only capable of dealing with one hub.

Before the spokes attempt to initiate transactions via EDI with the hub, the hub typically transmits various EDI schemas to the spokes so that the spokes may properly format the EDI transactions according to the EDI schemas. Currently, EDI schemas are large in size and the file size for each EDI schema typically ranges from 1 MB to 3 MB. In addition, the hub or large trading partners customarily transmit a large amount of schemas to the spokes, without taking into considerations of the spokes' lack of hardware capability. As such, thousands of such schemas, which may occupy several Gigabytes in bandwidth during transmission, are transmitted from the hub to the spokes.

Occasionally, the hub transmits one or more descriptions of the schemas in a non-EDI structure to the spokes. For example, the description may be in a sample data/instance file or even be a text file written in plain English explaining and describing what type of information needs to be included in the EDI schemas. Other times the hub may send an existing EDI schema in a format such as an image file, a portable document format (PDF) file, or the like.

In order to begin transactions between the parties, the spokes typically need a translation program or a "document definition" program to define a schema in the proper format. Current systems typically use a number of techniques such as using metadata to define an EDI transaction set from the description. However, current systems are limited in defining descriptions of EDI schemas to certain formats, such as eXtensible Markup Language (XML) format. In addition, existing techniques commence the translation process by integrating a sample instance, such as the description, delivered by the Hub and a set of word documents that elaborate on the EDI connectivity. This need of multiple documents to define a document definition reduces the efficiency of conducting business transactions.

SUMMARY

Embodiments of the invention overcome the shortcomings of the existing systems by creating a document definition using a description or a sample instance of an EDI transaction. In addition, embodiments of the invention heuristically analyze a plurality of data units described in the description to generate such document definition. Embodiments of the invention also avoid reliance on other documents elaborating the EDI connectivity in creating the document definition for such EDI schema.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 3 is a block diagram illustrating a description of an EDI schema according to an embodiment of the invention.

FIG. 7 is a block diagram illustrating one example of a suitable computing system environment in which the invention may be implemented.

Corresponding reference characters indicate corresponding parts throughout the drawings.

DETAILED DESCRIPTION

Figure 1:
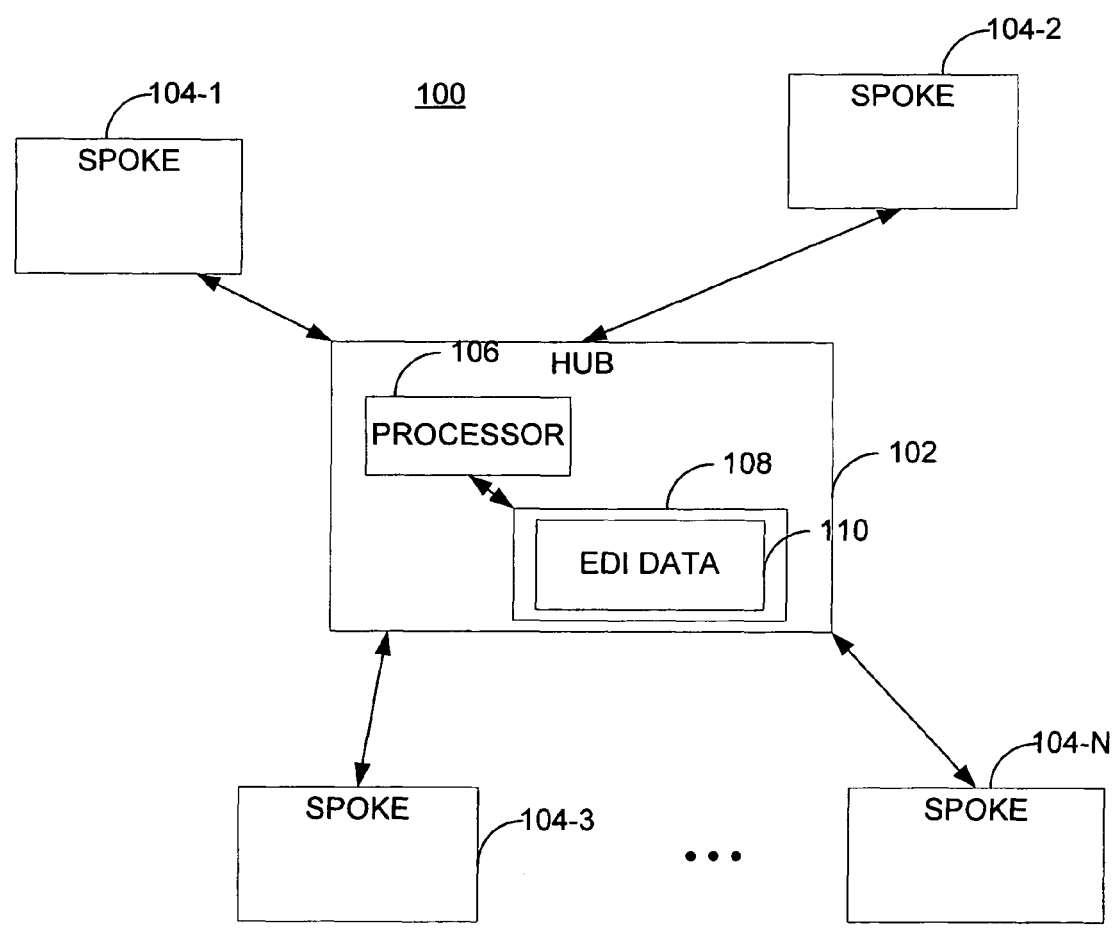
FIG. 1 is a block diagram illustrating a system for conducting electronic data interchange (EDI) transactions according to an embodiment of the invention.

Referring first to FIG. 1, a block diagram illustrates a system 100 for conducting electronic data interchange (EDI) transactions according to an embodiment of the invention. The system 100 includes a hub 102 linked to and communicating with one or more spokes 104. In one embodiment, the hub 102 includes a server computer or a computing device serving one or more processors (e.g., processor 106) or processing units for executing computer-executable instructions for serving the spokes 104. In one example, the spokes 104 include a computing device having one or more components included in or coupled with a computer 130, as shown in FIG. 7.

In one example, the hub 102 also includes a memory area 108 for storing one or more EDI schemas, such as an EDI schema 110. Initially, the hub 102 and the spokes 104 establish agreements as to the EDI formats or standards to be used for transmitting transaction data therebetween. Once the parties determine the particular EDI formats or standards to use, the hub 102 selects the appropriate EDI schemas to be transmitted to the spokes 104. In another example, the hub 102 may choose to select all EDI schemas for all types of transactions, such as purchase orders, bills of lading, invoices, payrolls, or the like, to the spokes 104. Although the communications between the hub 102 and the spokes 104 can be a private or public communications network, a wired or wireless network, the spokes 104 typically lack the hardware resources to handle large amount of EDI schemas sent from the hub 102. In addition, the type and bandwidth of computing network communications for the spokes 104 are not equipped to handle such demand imposed by the thousands of EDI schemas, which can reach several Gigabytes in data size.

Figure 2:
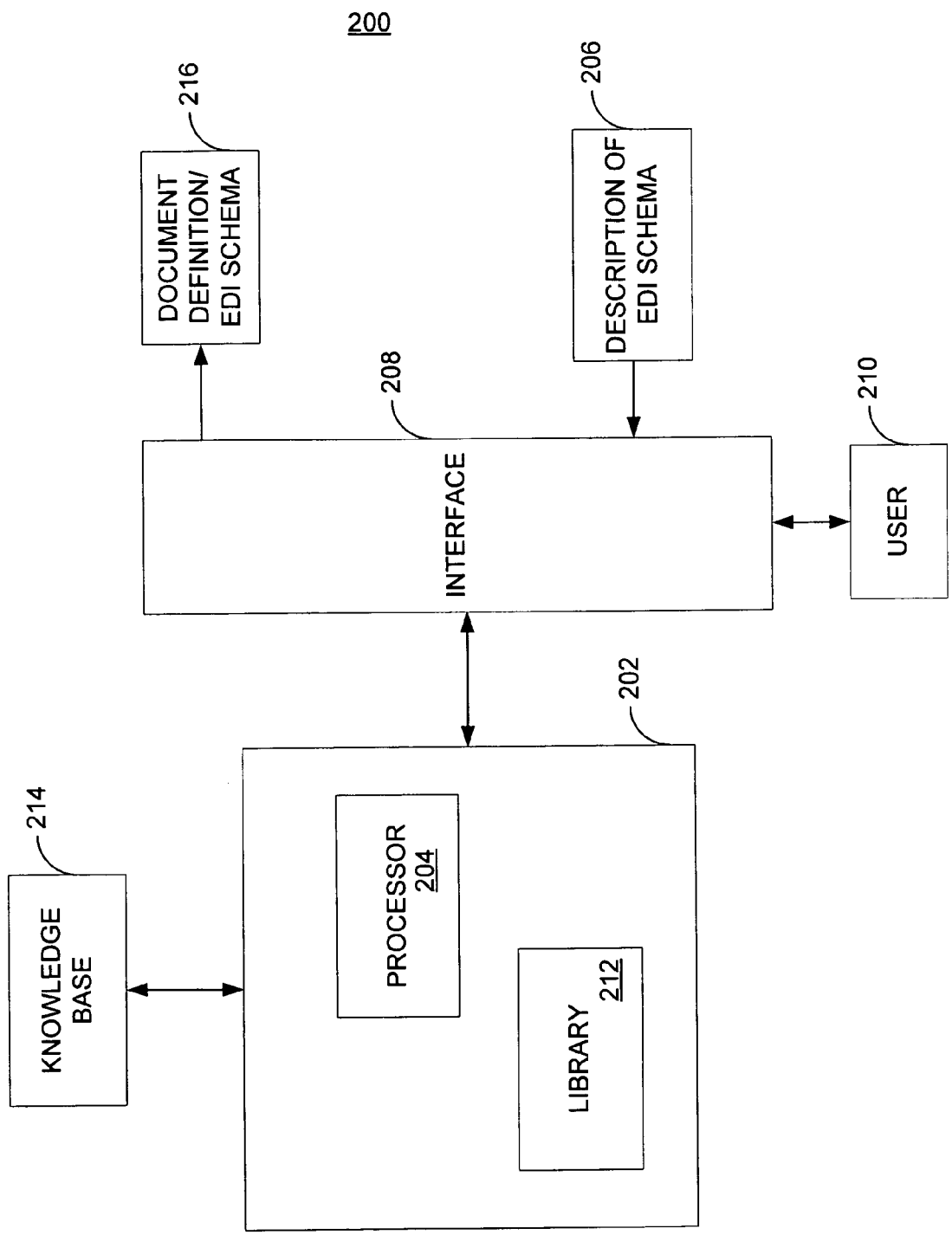
FIG. 2 is a block diagram illustrating a system for creating an EDI transaction from a description of the EDI schema according to an embodiment of the invention.

Referring now to FIG. 2, a block diagram depicts a system 200 for creating an EDI transaction from a description of the EDI schema according to an embodiment of the invention. The system 200 includes a computing device 202 (e.g., a hub 102 or a spoke 104-1) having a processing unit or a processor 204 for executing computer-executable instructions. For simplicity purpose only and not by limitation, the computing device 202 is used by a spoke for the following discussion.

Initially, two trading partners, a hub and a spoke, establish a trading agreement for transmitting transaction data using EDI. The hub, instead of sending an EDI schema to the spoke, transmits a description 206 of the schema and the format of the transaction data. In this example, the description 206 is an example of a purchase order EDI instance and illustrates a purchase order transaction data format in conformity with the hub's requirements.

The computing device 202 receives the description of the EDI schema 206 (e.g., a description 302 in FIG. 3) via an interface 208. In one embodiment, the interface 208 includes network interface protocols for handling data transmission over a common communications network, and a user interface (UI) for receiving user input from a user 210. In one embodiment, the description 206 may be stored in a data store (not shown) coupled to the computing device 204.

Upon receiving the description 206, the processor 204 identifies a plurality of data units included in the received description 206. Referring now to FIG. 3, a block diagram illustrates a description 302 of an EDI schema according to an embodiment of the invention. In one example, the plurality of data units includes data values associated with one or more of the following: transaction set definition, segment identification, and data elements.

The processor 204 next analyzes the identified plurality of data units to determine the content of the EDI schema. In one embodiment, the processor 204 queries a library 212 or the data store to determine whether a particular "Transaction Set ID," such as transaction set ID 306, exists in the library 212. If the particular transaction set ID is found in the library 212, the processor 204 determines that it has sufficient information to create an EDI schema based on the transaction set ID.

In this particular example, the description 302 includes one or more data units or segments in box 304, each data unit or segment describe the content of the EDI schema. In one embodiment, the processor 204 determines whether one or more transaction set identification is known from the identified plurality of data units.

The processor 204 also analyzes one or more identified segments and segment identifications (ID), which are also included in the plurality of data units. For example, a box 304 includes one or more segment headings or notifications in the description 302. In one embodiment, the processor 204 determines whether one or more segments and/or segment IDs exist in the library 212 in order to create the EDI schema. The processor 204 continues analyze the description 206 to create the EDI schema, such as one or more of the data elements.

In one embodiment, the processor 204 executes a set of programmed heuristic logic to determine or analyze properties of data elements. For example, an eight-character long of format of "199yMmDd" or "200yMmDd" may be determined to belong to the date data type. Similarly, decimal strings may be mapped to Nn data type (e.g., integer data type with implied decimal).

For example, the description 302 includes one or more data elements in one or more data types, such as an integer data element 308, "3859199838"; a date data type 310 or 312, "19950727 or 19970523"; a enumeration list data type 314, "KOW-20392-10"; a Nn data type 316 or 318, "35.68 or 2002.91"; and a string data type 320, "electronics cabinet package (56" high)".

In one embodiment, the processor 204 may provide partial results of the analysis via the interface 208 to the user 210 so that the user 210 may submit user input. In an alternative embodiment, the processor 204 accesses a knowledge base 214 to further analyze the plurality of the data units and/or the properties (e.g., data type) of the data elements.

Once the analysis is completed, the processor 204 generates or creates a document definition 216 for the EDI schema as a function of the analyzed plurality of data units. In one embodiment, the user 210 may manually review, verify, or modify the generated or created document definition 216. The user 210 or the processor 204 may use or apply the document definition to create an EDI transaction according to the document definition 216. In yet another embodiment, the processor 204 stores the document definition 216 for processing and/or composing EDI transaction data that match or comply with the particular EDI schema associated with the document definition 216.

While the description 302 is written in a certain format or style with a certain delimiter symbol, "*", it is to be understood that embodiments of the invention may process descriptions written in other formats or styles without departing from the scope of the invention.

Figure 4:
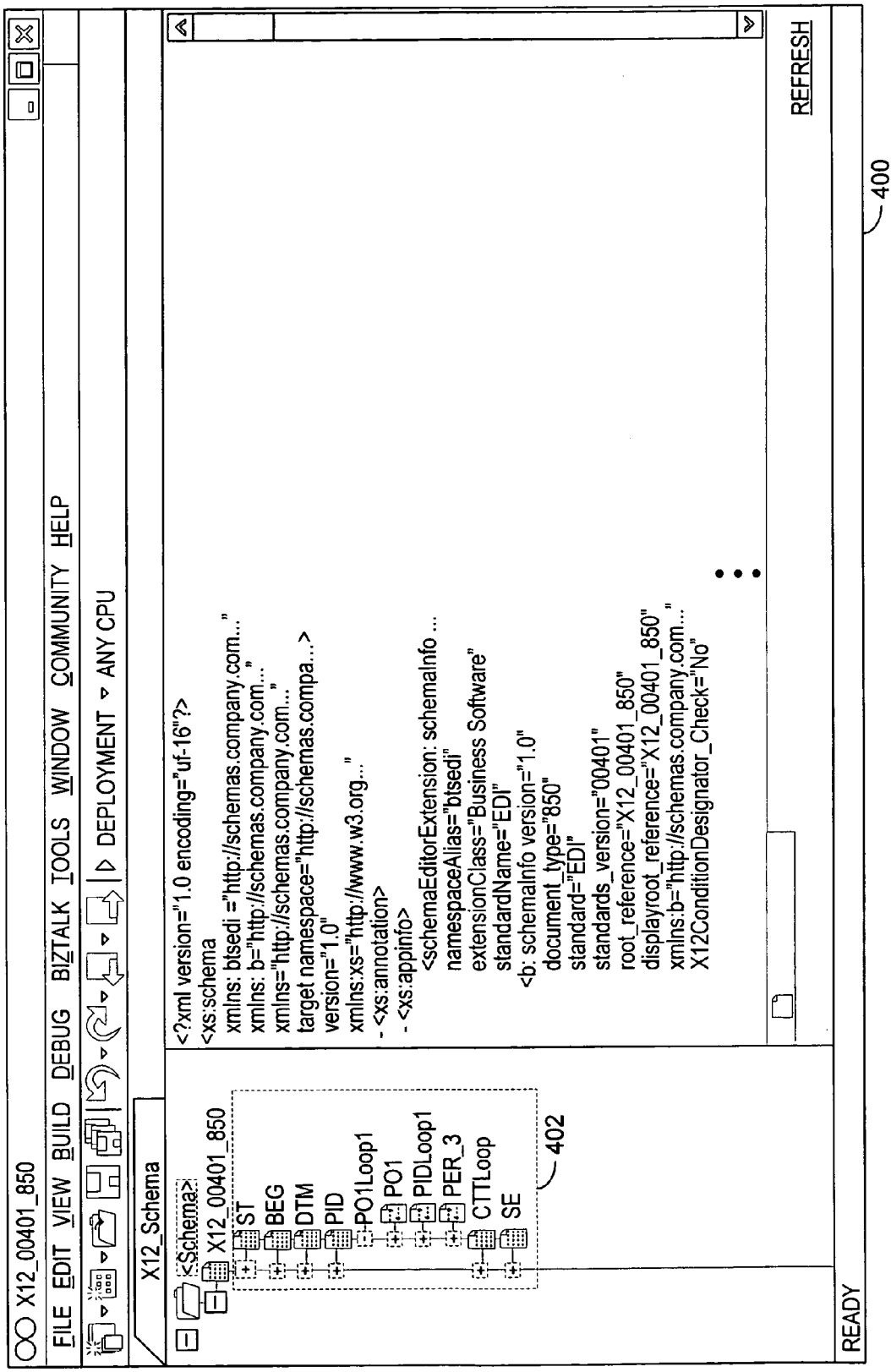
FIG. 4 is a screen shot illustrating an EDI schema created from the description in FIG. 3 according to an embodiment of the invention.

FIG. 4 is a screen shot illustrating an EDI schema 400 created from the description in FIG. 3 according to an embodiment of the invention. In particular, the EDI schema 400 shows the data as a result of the analysis of the description shown in FIG. 3. For example, a box 402 illustrates the structure in EDI schema derived from the description in a non-EDI structure in the description 302.

Figure 5:
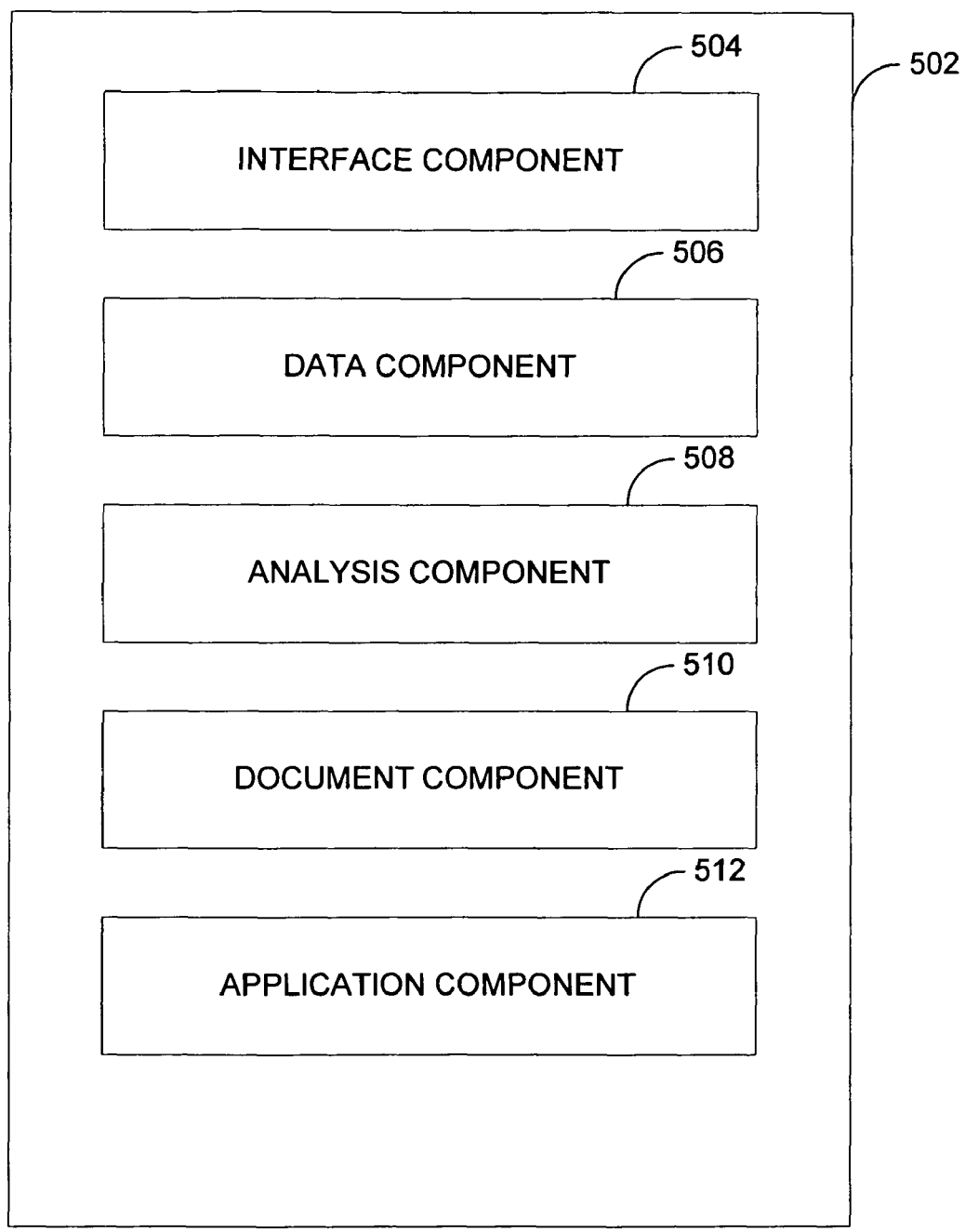
FIG. 5 is a block diagram illustrating an exemplary computer-readable medium on which aspects of the invention may be stored.
Figure 6:
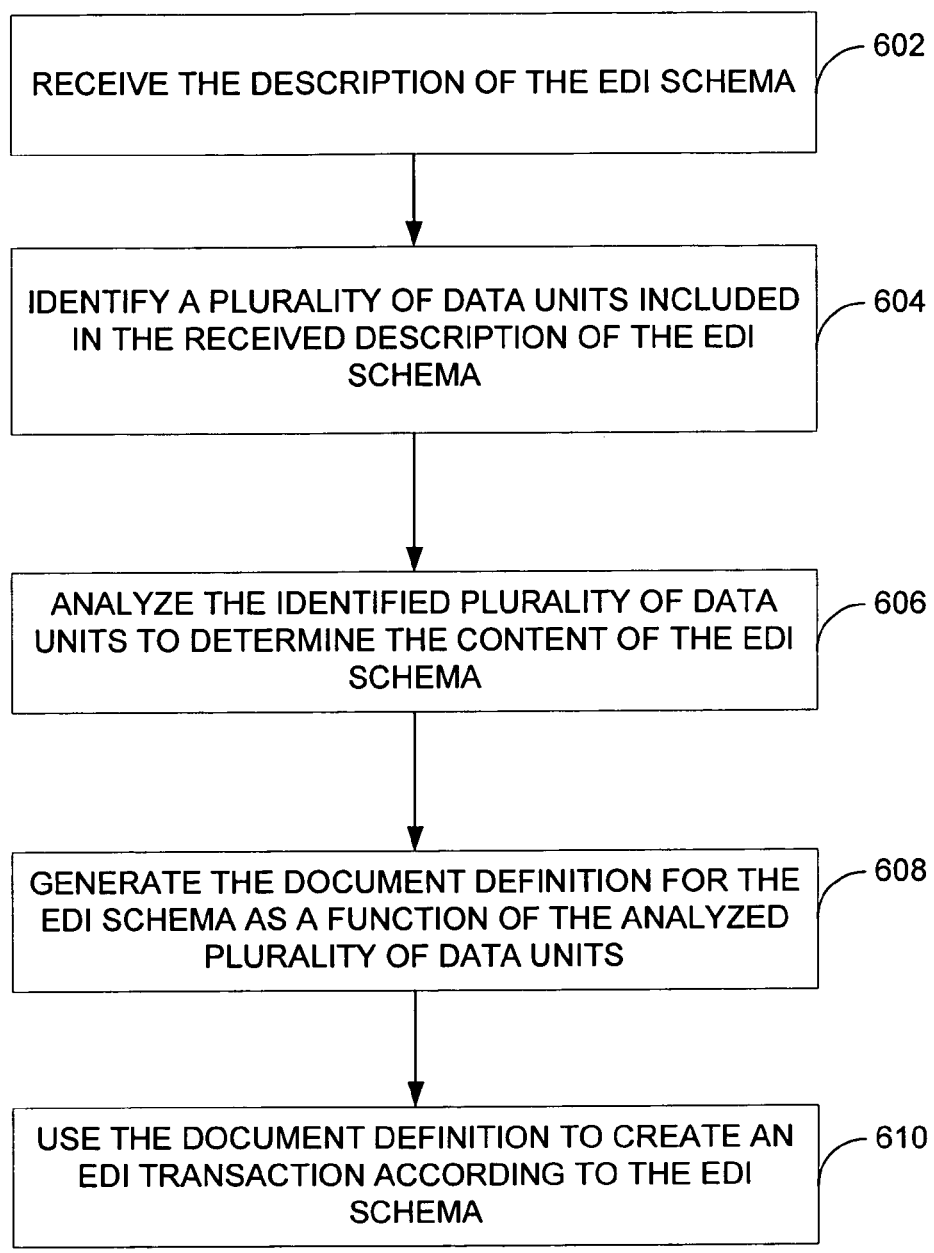
FIG. 6 is a flow chart illustrating operations of creating an electronic data interchange (EDI) transaction according to an embodiment of the invention.

FIG. 5 is a block diagram illustrating an exemplary computer-readable medium 502 on which aspects of the invention may be stored. For example, the computer-readable medium 502 includes one or more computer-executable components for performing operations illustrated in FIG. 6, which is a flow chart describing operations of creating an electronic data interchange (EDI) transaction according to an embodiment of the invention.

For example, an interface component 504 receives a description (e.g., description 302) of the EDI schema at 602. At 604, a data component 506 identifies a plurality of data units included in the received description of the EDI schema. The plurality of data units describes the content of the EDI schema. An analysis component 508 analyzes the identified plurality of data units to determine the content of the EDI schema at 606. At 608, a document component 510 generates or creates the document definition (e.g., document definition 216) for the EDI schema as a function of the analyzed plurality of data units. At 610, an application component 512 uses or applies the document definition to create an EDI transaction according to the EDI schema.

In operation, embodiments of the invention may be implemented according to the following example. A spoke or hub that wishes to transact business using EDI may receive a description of one or more EDI schemas in a non-EDI structure, such as a text file. In other words, the description does not provide an immediate application to be used in composing an EDI transaction. As such, a processor of a computing device at the location the spoke or the hub receives the description from the source, which may be another hub. The processor identifies or causes to identify a plurality of data units included in the received description of the EDI schema. The plurality of data units describes the content of the EDI schema. In one example, the plurality of data units may be delimited by one or more symbols or characters, such as a space, an asterisk, a dash, or other symbols.

The identified plurality of data units is analyzed to determine the content of the EDI schema. For example, the data units may include values, and the values may be categorized into one or more data types. Once the data units are analyzed, the processor may generate or create a document definition for the EDI schema as a function of the analyzed plurality of data units. By using the document definition, a user at the computing device at the spoke or the hub may use the document definition to create an EDI transaction according to the EDI schema to begin transact business with the trading partners.

By being able to generate or create a document definition from a description of the EDI schema only, not with additional documents or scripts, embodiments of the invention efficiently assist the users to quickly begin composing transaction data with the trading partners without a complicated translation process of the description and other supplemental data (e.g., metadata or documents).

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more computer storage media having computer-executable components for creating an electronic data interchange (EDI) transaction from a description of an EDI schema, said computer-executable components comprising:
   an interface component for receiving, instead of the EDI schema, the description of the EDI schema and other documents of the EDI schema specifying a format of the description, said received description being a non-EDI structured document and a non-self-describing markup language document, said received description comprising only a plurality of data units describing only the content of the transaction according to the EDI schema;
   a data component for separating the non-EDI structured document from the other EDI documents, said data component identifying the plurality of data units included in the received non-EDI structured document and associated with each of the following transaction set definition; segment ID; and data elements;
   an analysis component for analyzing the identified plurality of data units to determine a data type for each data unit and to determine the content of the EDI schema, said analysis component executing a set of programmed heuristic logic to determine properties of the plurality of data units, wherein the plurality of data units includes one or more of the following: a string, an integer, an enumeration list, an enumeration list having string type with restrictions, a date, and a time;
   a document component for generating a document definition for the EDI schema as a function of the analyzed plurality of data units based only on the received non-EDI structured document; and
   an application component for creating the EDI transaction according to the EDI schema using the generated document definition.

2. The computer storage media of claim 1, wherein the data component is configured to identify a structure of EDI schema.

3. The computer storage media of claim 1, wherein the interface component further receives a user input in identifying the plurality of data units.

4. The computer storage media of claim 1, further comprising a knowledge base, and wherein the document component accesses said knowledge base to determine properties of data elements for generating the document definition for the EDI schema.

5. A system for creating an electronic data interchange (EDI) transaction from a description of an unknown EDI schema, said system comprising: an interface for receiving the description of the unknown EDI schema, said received description being a non-EDI structured document and a non-self-describing markup language document, said received description comprising only a plurality of data units describing only the content of the transaction according to the EDI schema; a processor for executing computer-executable instructions for:
   identifying the plurality of data units included in the received non-EDI structured document;
   categorizing each of the identified plurality of data units into one or more data types, wherein the plurality of data units includes one or more of the following: a string, an integer, an enumeration list, an enumeration list having string type with restrictions, a date, and a time;
   analyzing the identified, categorized plurality of data units to determine the content of the EDI schema;
   generating a document definition for the EDI schema as a function of the analyzed plurality of data units and based only on the received non-EDI structured document; and
   creating the unknown EDI transaction according to the unknown EDI schema using the generated document definition.

6. The system of claim 5, wherein the processor is configured to identify a structure of the unknown EDI schema.

7. The system of claim 5, wherein the interface further receives a user input in identifying the plurality of data units.

8. The system of claim 5, wherein the plurality of data units includes data values associated with one or more of the following: transaction set definition, segment ID, and data elements.

9. The system of claim 8, further comprising a knowledge base, and wherein the processor is configured to access said knowledge base to determine properties of data elements for generating the document definition for the unknown EDI schema.

10. A method executed by a computer for creating an electronic data interchange (EDI) transaction from a description of an EDI schema, said method comprising computer executable instructions for:
    receiving, instead of the EDI schema, the description of the EDI schema and other E-D4 documents of the EDI schema specifying a format of the description, said received description being a non-EDI structured document describing a sample instance of an EDI transaction formatted according to the EDI schema, said received description comprising only a plurality of data units describing only the content of the transaction according to the EDI schema;
    separating the non-EDI structured document from the other EDI documents;
    identifying the plurality of data units included in the separated non-EDI structured document;
    categorizing each of the identified plurality of data units into data types, wherein said categorizing the plurality of data units comprises scanning the non-EDI structured document for each of the following data types: a string, an integer, an enumeration list, an enumeration list having string type with restrictions, a date, and a time;
    analyzing the identified, categorized plurality of data units to determine the content of the EDI schema;
    generating a document definition for the EDI schema as a function of the analyzed plurality of data units based only on the received non-EDI structured document; and
    creating the EDI transaction according to the EDI schema using the generated document definition.

11. The method of claim 10, wherein identifying the plurality of data units comprises identifying a structure of EDI schema.

12. The method of claim 10, further comprising receiving a user input in identifying the plurality of data units.

13. The method of claim 10, wherein identifying the plurality of data units comprises identifying the plurality of data units including data values associated with each of the following: transaction set definition, segment ID, and data elements.

14. The method of claim 13, further comprising accessing a knowledge base to determine properties of data elements for generating the document definition for the EDI schema.

15. The method of claim 10, wherein generating comprises generating an eXtensible Markup Language (XML) template for the EDI schema.

16. The method of claim 10, wherein one or more computer storage media have computer-executable instructions for performing the method of claim 10.

* * * * *